(12) United States Patent
Mulder

(10) Patent No.: US 8,839,999 B2
(45) Date of Patent: Sep. 23, 2014

(54) INTEGRATED HUB AND SPINDLE ASSEMBLY AND A SELF-ALIGNING TRACTOR AXLE MOUNTED TANK SYSTEM

(75) Inventor: Ryan Brent Mulder, Sheldon, IA (US)

(73) Assignee: Dethmers Manufacturing Company, Boyden, IA (US)

(*) Notice: Subject to any disclaimer, the term of this patent is extended or adjusted under 35 U.S.C. 154(b) by 159 days.

(21) Appl. No.: 13/216,872

(22) Filed: Aug. 24, 2011

(65) Prior Publication Data

US 2013/0048688 A1 Feb. 28, 2013

(51) Int. Cl.
*B60P 3/22* (2006.01)
*A01M 7/00* (2006.01)

(52) U.S. Cl.
CPC .................................. *A01M 7/0085* (2013.01)
USPC ............................. 224/410; 280/830; 280/833

(58) Field of Classification Search
CPC ........... B60R 9/00; B60B 35/12; F16M 13/02
USPC ................ 224/410; 248/205.1, 201; 301/126; 280/830, 833
See application file for complete search history.

(56) References Cited

U.S. PATENT DOCUMENTS

| | | | | |
|---|---|---|---|---|
| 2,442,889 A * | 6/1948 | Deal | | 296/3 |
| 2,743,934 A * | 5/1956 | Chambers et al. | | 280/833 |
| 2,946,598 A * | 7/1960 | Foster | | 280/830 |
| 3,311,183 A * | 3/1967 | Phillips | | 180/54.1 |
| 3,396,983 A * | 8/1968 | Massey et al. | | 280/830 |
| 3,583,718 A * | 6/1971 | Meyer | | 280/830 |
| 3,857,576 A * | 12/1974 | Wilt | | 280/834 |
| 3,900,201 A * | 8/1975 | Johnson et al. | | 280/833 |
| 4,149,734 A * | 4/1979 | Sylvester | | 280/833 |
| 4,351,535 A * | 9/1982 | Mead | | 280/830 |
| 4,643,441 A * | 2/1987 | Schartz | | 280/830 |
| 6,286,870 B1 * | 9/2001 | Mulder et al. | | 280/833 |
| 7,044,504 B2 * | 5/2006 | Studebaker et al. | | 280/783 |
| 8,561,960 B2 * | 10/2013 | Sinclair | | 248/518 |

OTHER PUBLICATIONS

Demco, Operators Manual, SideQuest, Nov. 2009, 24 pages, published online at http://demco-products.com/agriculture/fieldsprayers/tractormounted/sidequest/sidequest700.html.

* cited by examiner

*Primary Examiner* — Justin Larson
*Assistant Examiner* — Lester L Vanterpool
(74) *Attorney, Agent, or Firm* — Brick Gentry PC; Brian J. Laurenzo; Jessica L. Susie

(57) ABSTRACT

A self-aligning tractor axle mounted tank system for vertically mounting a tank to a tractor is provided comprising; an integrated hub and spindle, a housing connected to the spindle so that the spindle can rotate with respect to the housing, and at least one housing bracket connected to the housing and adapted to mount a tank frame assembly, wherein the housing bracket is configured to align the tank frame assembly with the housing during vertical mounting. Additionally, an integrated hub and spindle assembly is provided comprising; a spindle connected to a hub, and a bearing housing connected to the spindle so that the spindle can rotate with respect to the bearing housing. Furthermore, a process for mounting a self-aligning tank to the rear axle of a tractor is provided.

19 Claims, 12 Drawing Sheets

INTEGRATED HUB AND SPINDLE ASSEMBLY AND A SELF-ALIGNING TRACTOR AXLE MOUNTED TANK SYSTEM

FIELD OF THE INVENTION

The present invention relates to tractor axle mounted tanks. More specifically, the present invention relates to an integrated hub and spindle assembly and a self-aligning tractor axle mounted tank system.

BACKGROUND

Tanks may be used for a variety of purposes with tractors, including storage of fuel, chemicals, fertilizers, pesticides, and the like. Because large amounts of fuel or chemicals may be used during agricultural processes, it is desirable to allow for the mounting of large tanks to tractors so that the tractor operator will be able to more efficiently accomplish a task.

Several types of brackets and mounting systems are available to mount tanks to tractors. Typical tank mounting systems attach tanks to the side frame of the tractor so that the tanks are mounted substantially near the front axle and tires of the tractor. U.S. Pat. No. 2,743,934, issued to Chambers et al. on May 1, 1956, and U.S. Pat. No. 4,149,734, issued to Sylvester on Apr. 17, 1979, disclose such tractor tank mounting apparatuses. U.S. Pat. No. 3,311,183, issued to Phillips, discloses another tractor tank mounting apparatus that does not mount tanks to tractors in the most feasible manner.

Most prior art tank mounting devices, as noted above, mount the tanks substantially near the front axle and tires of the tractor so that the majority or a substantial portion of the weight of the tanks rests on the front axle and tires of the tractor. Several problems result from mounting tanks in such a manner. The front tires of tractors, which are typically much smaller than the rear tires, are not designed to carry as much weight as the rear tires. The typical placement of tanks near the front axle, therefore, places an undue amount of weight on the front axle and tires of the tractor. Not only does this increase the chance of malfunction of the front tires and axle, but it limits the size of the tanks that may be mounted to the tractor. If large tanks are mounted to the side of the tractor, tire manufacturer and tractor manufacturer maximum weight recommendations may well be exceeded.

U.S. Pat. No. 6,286,870 issued to Mulder et al. on Sep. 11, 2001 ('870) discloses a tractor tank mounting apparatus wherein a tank is mounted so that a substantial portion of the weight of the tank rests on the rear axle and tires of the tractor, so that a sufficiently large tank may be mounted to the tractor to aid in the efficiency of tractor operation. The '870 patent discloses horizontally inserting a spindle into a support frame and manually aligning the support frame with the spindle.

A need still exists for a tractor tank mounting apparatus and process that significantly reduces the difficulties associated with mounting rear tractor axle mounted tanks. The traditional tank mounting apparatus are difficult to align and must be supported during mounting.

SUMMARY OF THE INVENTION

This Summary is provided to introduce a selection of concepts in a simplified form that is further described below in the Detailed Description. This Summary is not intended to identify key aspects or essential aspects of the claimed subject matter. Moreover, this Summary is not intended for use as an aid in determining the scope of the claimed subject matter.

A self-aligning tractor axle mounted tank system for vertically mounting a tank to a tractor is provided comprising; an integrated hub and spindle, a housing connected to the spindle so that the spindle can rotate with respect to the housing, and at least one housing bracket connected to the housing and adapted to mount a tank frame assembly, wherein the housing bracket is configured to align the tank frame assembly with the housing during vertical mounting. Additionally, the housing bracket is adapted to receive at least one attachment for attaching the tank frame assembly to the housing bracket. Furthermore, the tank frame assembly comprises a stabilizing arm; the tank frame stabilizing arm comprises a receiver bushing which is adapted to receive a male guide member of a guide arm assembly attached to the tractor. The tank frame stabilizing arm supports and stabilizes the tank frame assembly during and after attachment. An integrated hub and spindle assembly is also provided comprising; a spindle connected to a hub and a bearing housing connected to the spindle so that the spindle can rotate with respect to the bearing housing. The bearing housing comprises at least one bearing assembly positioned to approximately evenly distribute a load placed on the bearing housing.

Additionally, a process for mounting a self-aligning tank to the axle of a tractor is provided comprising the steps of; attaching a drum to the rear axle, connecting an integrated hub and spindle assembly to the drum, the spindle having a bearing housing connected thereto such that the spindle can rotate with respect to the bearing housing, the bearing housing having at least one bracket connected to the top of the bearing housing, attaching a guide arm assembly to the tractor, the guide arm assembly having a male guide member for connection to a tank frame stabilizing arm, wherein the tank frame stabilizing arm comprises a receiver bushing which is adapted to receive the male guide member, lowering the tank frame assembly and tank onto the bearing housing and guide arm assembly, wherein the tank frame assembly is aligned by the bracket and supported by the guide arm assembly and hub and spindle assembly, securing the to the guide arm assembly, and securing at least one bracket to the tank frame assembly.

The above-mentioned process and apparatus guide the alignment of the tractor axle mounted tank during mounting to the tractor axle. Additionally, the improved bearing orientation disclosed herein evenly distributes the load on the bearings, increasing the life of the bearings. Furthermore, the process of vertically attaching the tank allows gravity to hold the tank, and the tank frame assembly, in position while attachment members are installed, securing the frame. The disclosed apparatus and process significantly reduce the difficulties associated with the mounting of a tractor axle mounted tank.

The above-mentioned process and apparatus solve the problems disclosed in the Background and have numerous advantages over the traditional means of mounting a tank to the axle of a tractor. Additionally, other features and advantages of the process and apparatus will become more fully apparent and understood with reference to the following Detailed Description, Drawings, and Claims.

BRIEF DESCRIPTION OF THE DRAWINGS

FIG. 1 illustrates the integrated hub and spindle assembly and self-aligning tractor axle mounted tank system, wherein the tank frame assembly is ultimately attached to the tractor.

FIG. 2A illustrates the integrated hub and spindle assembly and self-aligning tractor axle mounted tank system, wherein the tank and tank frame assembly are shown detached and above the guide arm assembly and integrated hub and spindle assembly.

FIG. 2B illustrates the tank and tank frame assembly detached and above the guide arm assembly and integrated hub and spindle assembly as viewed from the front of the tractor.

FIG. 3A illustrates the brackets on the bearing housing of the integrated hub and spindle assembly and on the tank frame assembly detached and separated from each other.

FIG. 3B illustrates the secured brackets after mounting.

FIG. 4C illustrates the bearing assembly within the bearing housing and surrounding the spindle.

FIG. 6 illustrates a cut-away view of the tank frame stabilizing arm showing the receiver bushing for receiving the male guide member of the guide arm assembly. Additionally, FIG. 6 discloses slots in the tank frame body for adjustably attaching the tank frame stabilizing arm.

FIG. 7A illustrates the step of the process in which the drum is attached to the rim of the tire and the rear axle of a tractor.

FIG. 7B illustrates the step of the process in which the integrated hub and spindle assembly is attached to the drum.

FIG. 7C illustrates the step of the process in which the guide arm assembly is attached to the tractor.

FIG. 7D illustrates the step of the process in which the tank and tank frame assembly are lowered onto the spindle assembly and guide arm assembly.

FIG. 7E illustrates the step of the process in which the tank frame assembly is aligned to the integrated hub and spindle assembly by the mating brackets on the bearing housing and the guide member on the guide arm assembly; and FIG. 7F illustrates the step of the process in which the tank frame assembly has been fixedly attached to the integrated hub and spindle assembly and the guide arm assembly.

DETAILED DESCRIPTION

The following is a detailed description of the illustrated embodiments of an integrated hub and spindle assembly, a self-aligning tractor axle mounted tank system, and a process regarding same. For ease of discussion and understanding, the following detailed description and illustrations may refer to specific tanks, tractors or machinery. It should be appreciated that the specific tanks, tractors or machinery may be of any type, style, or arrangement known or future developed that would be advantageous to use with the integrated hub and spindle assembly or self-aligning tractor axle mounted tank system. Additionally, attachment to the rear axle of a tractor is discussed and illustrated on one side of the tractor; however, it should be appreciated that the apparatus and method disclosed could be attached to any side or multiple sides of the tractor as described herein.

Figure 1:
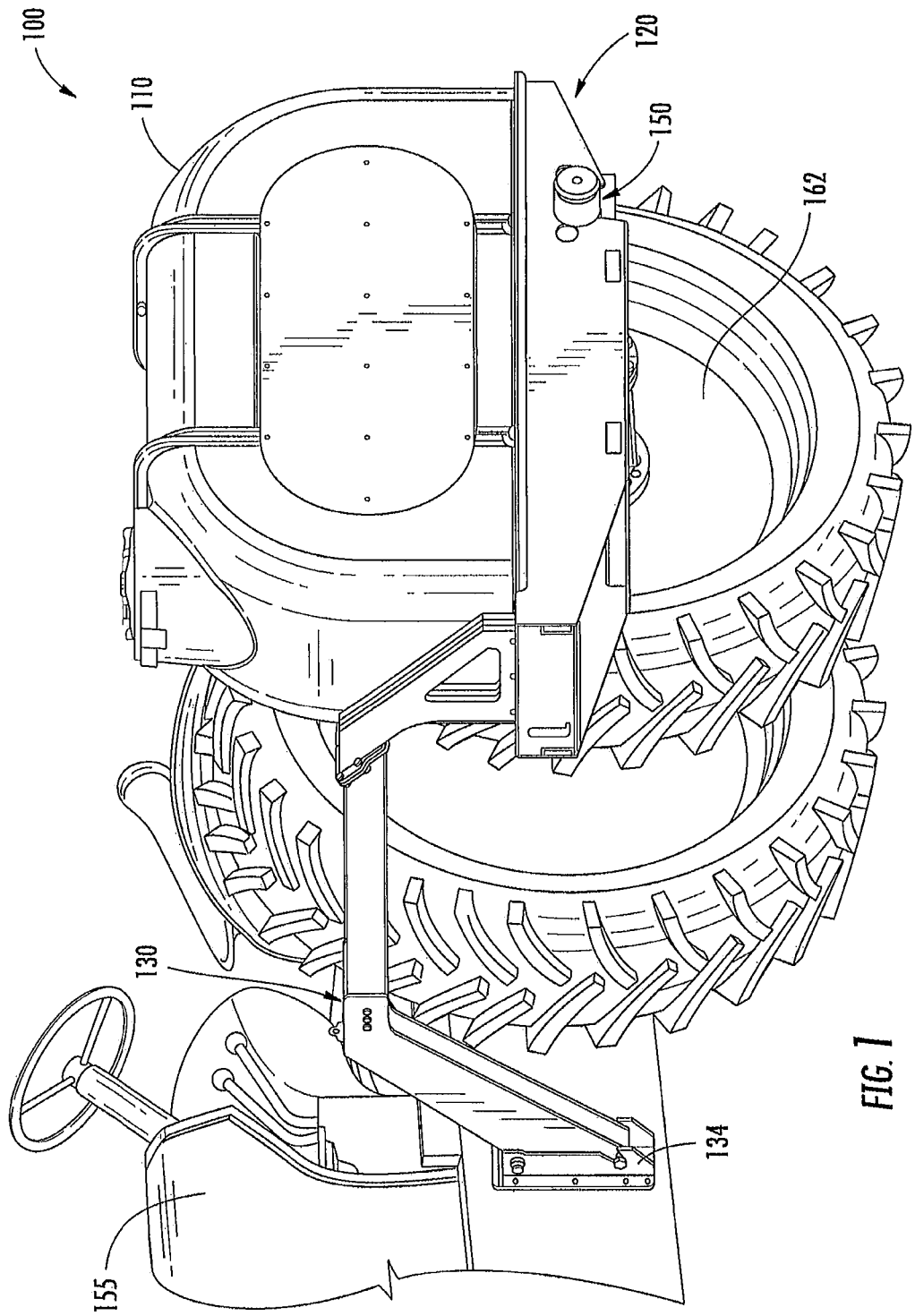
FIG. 1 is a perspective view of a tractor having a tank, in a tank frame assembly, attached to a guide arm assembly and an integrated hub and spindle assembly.

FIG. 1 is a perspective view of a self-aligning tractor axle mounted tank system 100 and an integrated hub and spindle assembly 150 attached to a tractor 155. In FIG. 1 a tank frame assembly 120, and tank 110 therein, is illustrated attached to a guide arm assembly 130 and the integrated hub and spindly assembly 150. The integrated hub and spindle assembly 150 is attached to a rear rim 162 of a tractor tire 160 of the tractor 100. Additionally, the guide arm assembly 130 includes a tractor attachment plate 134 which is attached to the tractor 100.

Figure 2A:
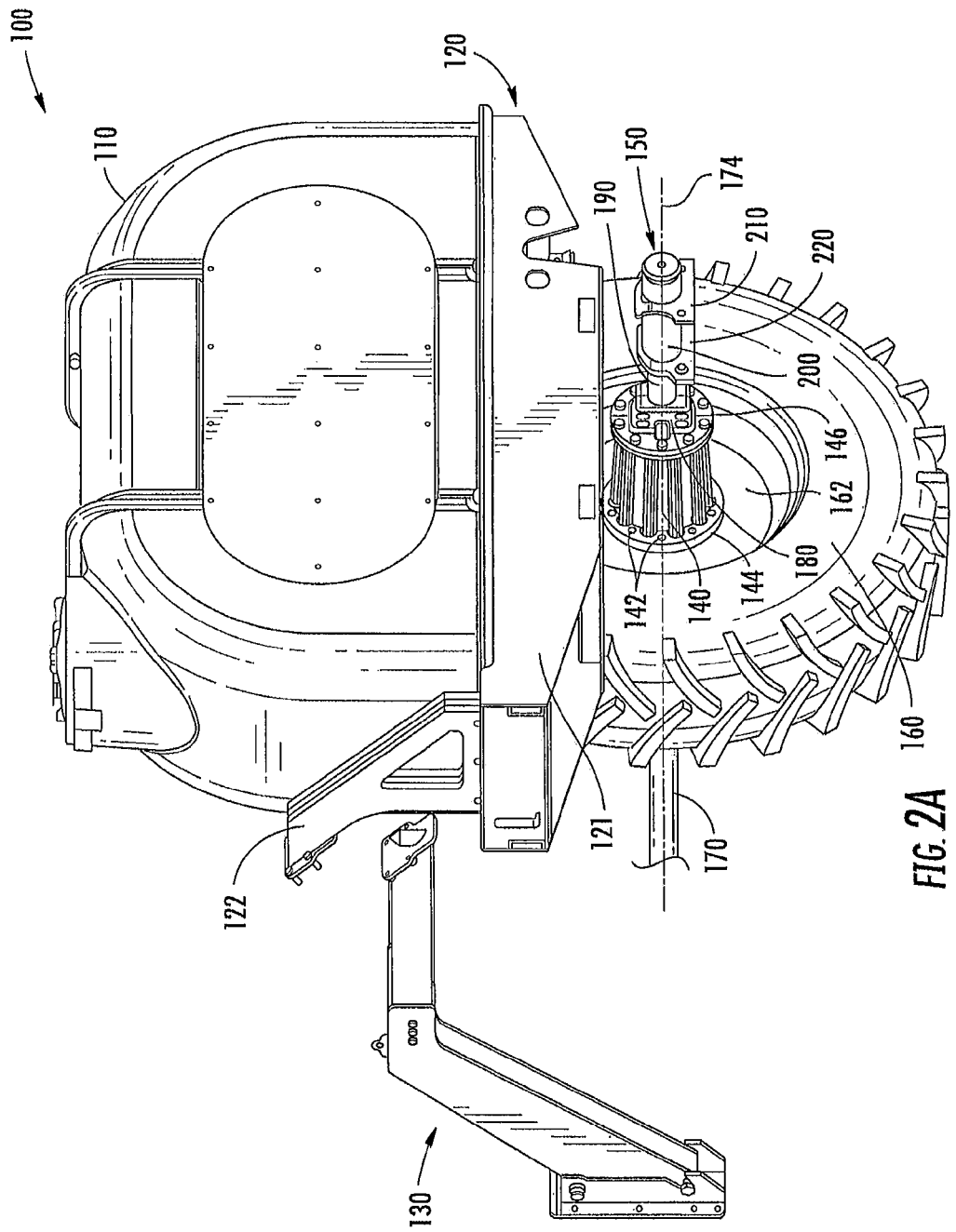
FIG. 2A is a perspective view of the tank in the tank frame assembly, the guide arm assembly, a drum, the integrated hub and spindle assembly, the rear axle of the tractor and a tractor tire.

FIG. 2A is a perspective view of the tank 110 in the self-aligning tank frame assembly 120, a tank frame stabilizing arm 122, the guide arm assembly 130, a drum 140, the integrated hub and spindle assembly 150, a rear axle 170 of the tractor 155 (shown in FIG. 1) and the tractor tire 160. FIG. 2A illustrates the integrated hub and spindle assembly 150 and self-aligning tractor axle mounted tank system 100, wherein the tank 110 and tank frame assembly 120 are shown detached and above the guide arm assembly 130 and integrated hub and spindle assembly 150. The integrated hub and spindle assembly 150 comprises a hub 180 and spindle 190 and is adapted to mount the self-aligning tank frame assembly 120 to the tractor 155 (shown in FIG. 1). In general, the drum 140 is attachable to the rear axle 170 of the tractor 155, typically through the rim 162 of the rear tire 160. The rear axle 170 and the rim 162 have a longitudinal axis of rotation 174. Therefore, once the drum 140 and the spindle 190 are attached to the rear axle 170, they all have the same longitudinal axis of rotation 174. Alternatively, it is anticipated that the integrated hub and spindle assembly 150 may be directly attached to the rear axle 170. FIG. 2A also depicts an integrated hub 180 and spindle 190 attached to the drum 140. Additionally, a bearing housing 200 is connected to the spindle 190 so that the spindle 190, hub 180, drum 140, rim 162, tire 160 and axle 170 can rotate with respect to the bearing housing 200. FIG. 2A further illustrates a first bearing housing bracket 210 and a second bearing housing bracket 220 attached to the bearing housing 200, wherein each of the first and second bearing housing brackets 210, 220 are positioned and shaped to align the tank frame assembly 120 during mounting.

The axle 170, rim 162, and tire 160 may be any axle, rim, and tire currently known or developed in the future and may be attached to any tractor or machine that could properly support the attachment of these parts to the drum 140 or directly to the hub 180. Generally, the drum attaches to the rim of the rear tractor axle of any tractor. The drum 140 may be fixedly attached using any fastener or device known to those skilled in the art, including the bolts 142 shown in FIG. 2A, which may be the same bolts that typically attach rims to axles. The drum 140 may be of any shape and may be made from any rigid material, such as stainless steel. In the preferred embodiment, the drum 140 is substantially cylindrical in shape and may include a mounting plate 144 attached at one end and a face plate 146 at the other end. The mounting plate 144 may be attached with the bolts 142 to the rear rim 162. The face plate 146 contains attachments and the like so that it may be used to attach the drum 140 to the remainder of the mounting apparatus. The drum 140 may be substantially hollow, although a portion of it may also be solid.

The drum 140 supports attachment of the integrated hub and spindle assembly 150. In the preferred embodiment, the hub 180 may be fixedly attached to the face plate 146 of the drum 140 using bolts, screws, welding, or any other fastener or device known to those skilled in the art. In other embodiments, the hub may be directly connected to the rim 162 or to the axle 170. The hub 180 and spindle 190 are a unified piece or integrated. The hub 180 and spindle 190 may be made of any material strong enough to support the full load of the tank 110 and tank frame assembly 120. The spindle 190 extends from within the drum 140 or substantially adjacent to the drum 140 and hub 180 at a first end 191 (shown in FIG. 4A) to a second end 192 (shown in FIG. 4A). The spindle 190 may be a substantially cylindrical or tubular member of any variety and may be solid, partially solid, or substantially hollow. The integrated hub and spindle assembly 150 further comprises the bearing housing 200 connected to the spindle 190 so that the spindle 190 may rotate with respect to the bearing housing 200.

Figure 2B:
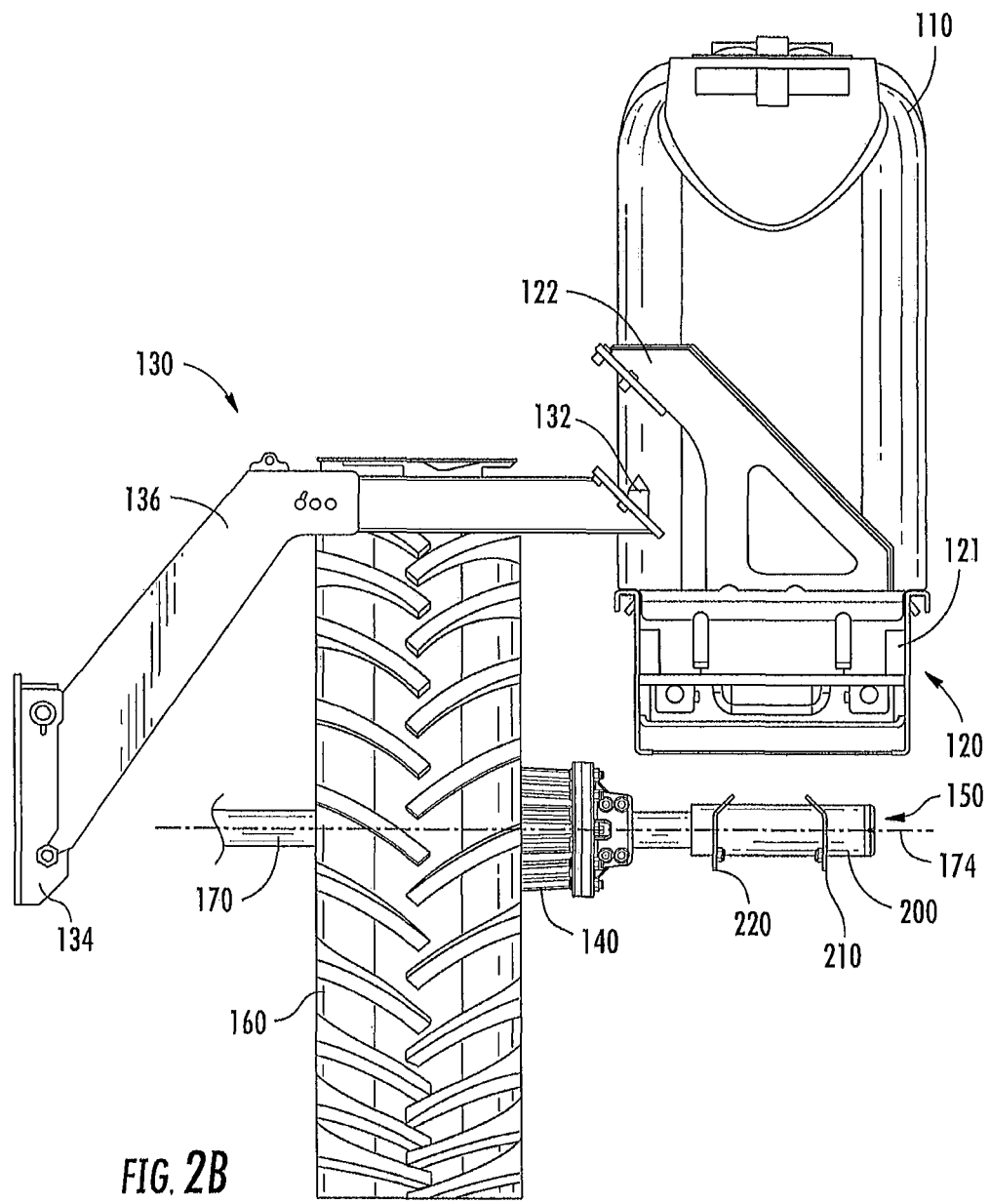
FIG. 2B is a front elevational view of the tank in the tank frame assembly, the guide arm assembly, the drum, the integrated hub and spindle assembly, the rear axle of the tractor and the tractor tire.

Attached to the outside of the bearing housing 200 in FIG. 2B are the first and second bearing housing brackets 210, 220. In the preferred embodiment, the first and second bearing housing brackets 210, 220 are mateable with third and fourth tank frame brackets 215, 225 (shown in FIG. 3A) within the tank frame assembly 120. All of the brackets 210, 215, 220, 225 may be made out of any material suitable to align the tank frame assembly 120 during mounting and to secure the tank frame assembly 120 in place. In the preferred embodiment, all of the brackets 210, 215, 220, 225, the spindle assembly 150 and the tank frame assembly 120 are made out of metal.

FIG. 2B is a front elevational view of the tank 110 in the tank frame assembly 120, the guide arm assembly 130, the drum 140, the hub and spindle assembly 150, and the tractor tire 160. FIG. 2B illustrates the tank 110 and tank frame assembly 120 detached and above the guide arm assembly 130 and integrated hub and spindle assembly 150 as viewed from the front of the tractor 155 (shown in FIG. 1). The tank frame assembly 120 comprises a body portion 121 and the tank frame stabilizing arm 122 for vertically receiving a male guide member 132 from the guide arm assembly 130. In the preferred embodiment, the tank frame stabilizing arm 122 generally extends up and away from the tank frame body portion 121 and towards the tractor 155 (shown in FIG. 1). The tank frame stabilizing arm 122 is configured to receive the male guide member 132 and assist in the alignment of the tank frame assembly 120 during mounting. Additionally, the tank frame stabilizing arm 122 provides additional support and balance for the tank frame assembly 120 while the tank frame assembly 120 is being fastened to the first and second bearing housing brackets 210, 220. Additionally, FIG. 2B discloses a tractor attachment plate 134, and an angled body portion 136. In the preferred embodiment, the tractor attachment plate 134 is generally rectangular and may be attached to the tractor (shown in FIG. 1) by bolts, screws, welding, or any other fastener or device known to those skilled in the art. Additionally, the tractor attachment plate 134 is also attached to the angled body portion 136 of the guide arm assembly 130. The tractor attachment plate 134 and guide arm assembly 130 may be attached to any side of the tractor 155 (shown in FIG. 1). Accordingly, the guide arm assembly 130 would extend away from whatever side of the tractor 155 (shown in FIG. 1) to which it is attached. In order to attach the tank 110 and tank frame assembly 120 to the other side of the tractor 155 (shown in FIG. 1), the tank frame stabilizing arm 122 may be horizontally reversed so that the tank frame stabilizing arm 122 would extend away from the tank frame body portion 121 and towards the side of the tractor 155 (shown in FIG. 1).

Figure 3A:
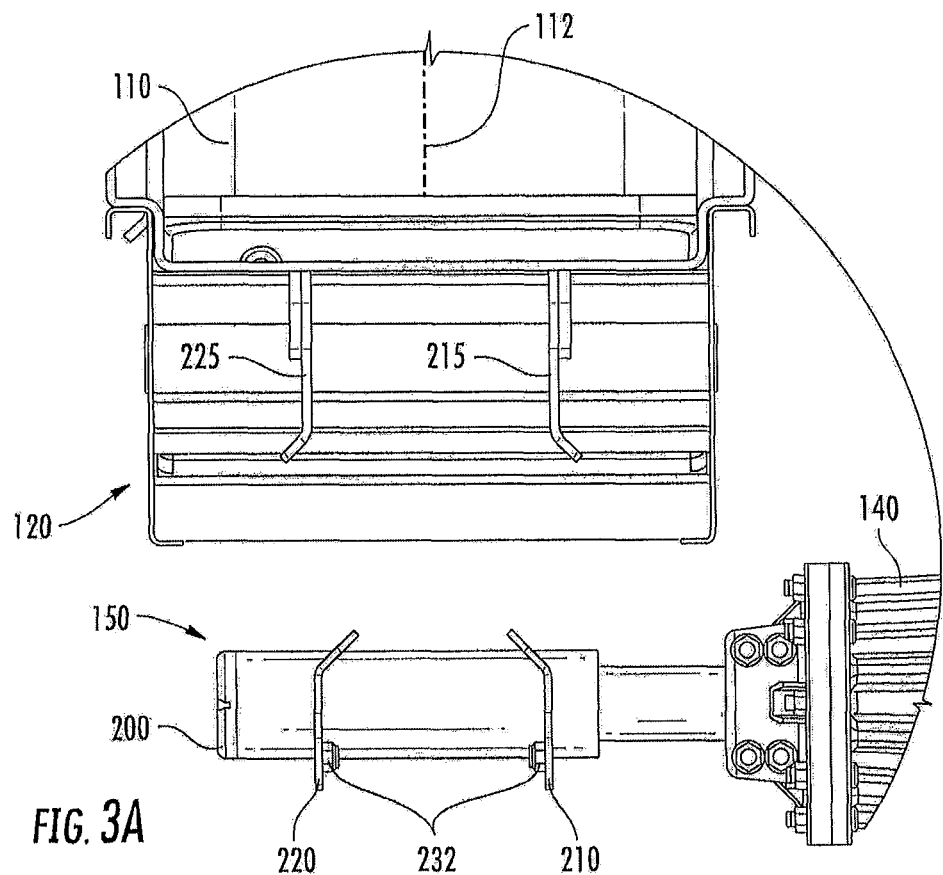
FIG. 3A is an enlarged partial rear view of the tank in the tank frame assembly, the drum, and the integrated hub and spindle assembly.

FIG. 3A is an enlarged partial rear view of the tank 110 in the tank frame assembly 120, the drum 140, and the integrated hub and spindle assembly 150. FIG. 3A illustrates bearing housing brackets 210, 220 on the bearing housing 200 of the integrated hub and spindle assembly 150 and the tank frame brackets 215, 225 on the tank frame assembly 120 as viewed from the rear of the tractor (shown in FIG. 1). In FIG. 3A the tank 110 and tank frame assembly 120 are detached and above the integrated hub and spindle assembly 150. As the tank 110 and tank frame assembly 120 are lowered onto the integrated hub and spindle assembly 150 the brackets 210, 215, 220, 225 provide for the proper alignment of the tank frame assembly 120 with the integrated hub and spindle assembly 150.

Figure 3B:
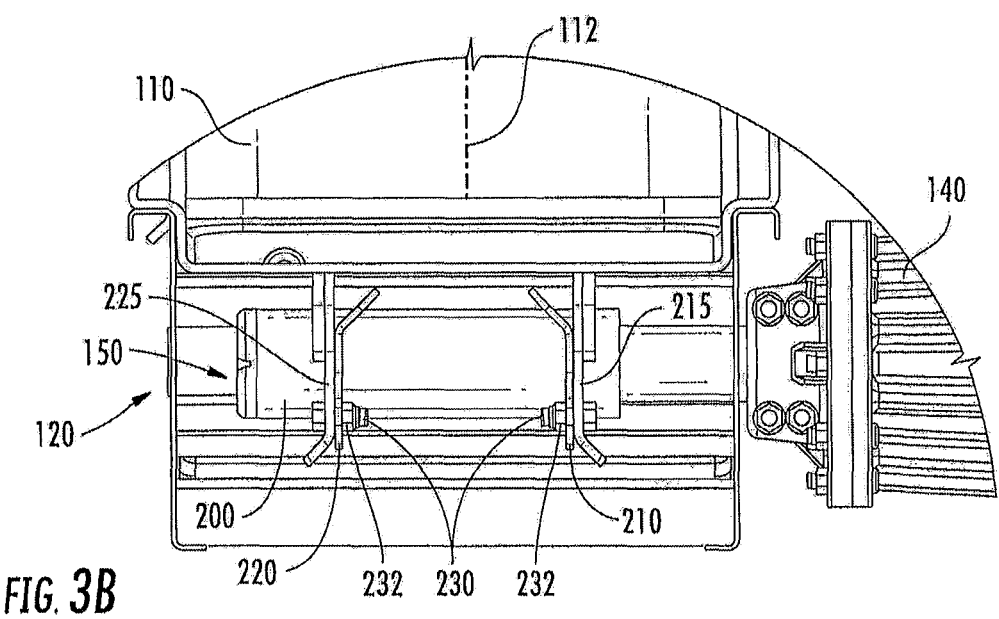
FIG. 3B is an enlarged partial rear view of the tank in the tank frame assembly, the drum, and the integrated hub and spindle assembly.

FIG. 3B is an enlarged partial rear view of the tank 110 in the tank frame assembly 120, the drum 140, and the integrated hub and spindle assembly 150. FIG. 3B illustrates bearing housing brackets 210, 220 on the bearing housing 200 of the integrated hub and spindle assembly 150 and the tank frame brackets 215, 225 on the tank frame assembly 120 as viewed from the rear of the tractor (shown in FIG. 1) after mounting. After the tank frame assembly 120 has been lowered and the brackets 210, 215, 220, 225 have aligned the tank frame assembly 120 and the integrated hub and spindle assembly 150, attachment members, such as nuts 232 and bolts 230, are used to fasten the tank frame assembly 120 to the hub and spindle assembly 150. The nuts 232 and bolts 230 secure the tank frame assembly 120 to the integrated hub and spindle assembly 150. In the preferred embodiment, nuts 232 and bolts 230 are used to fasten the tank frame assembly 120 and the hub and spindle assembly 150, however, it is anticipated that the tank frame assembly 120 and hub and spindle assembly 150 may be attached or fastened by any means currently known or developed in the future capable of providing a secure attachment.

Figure 4A:
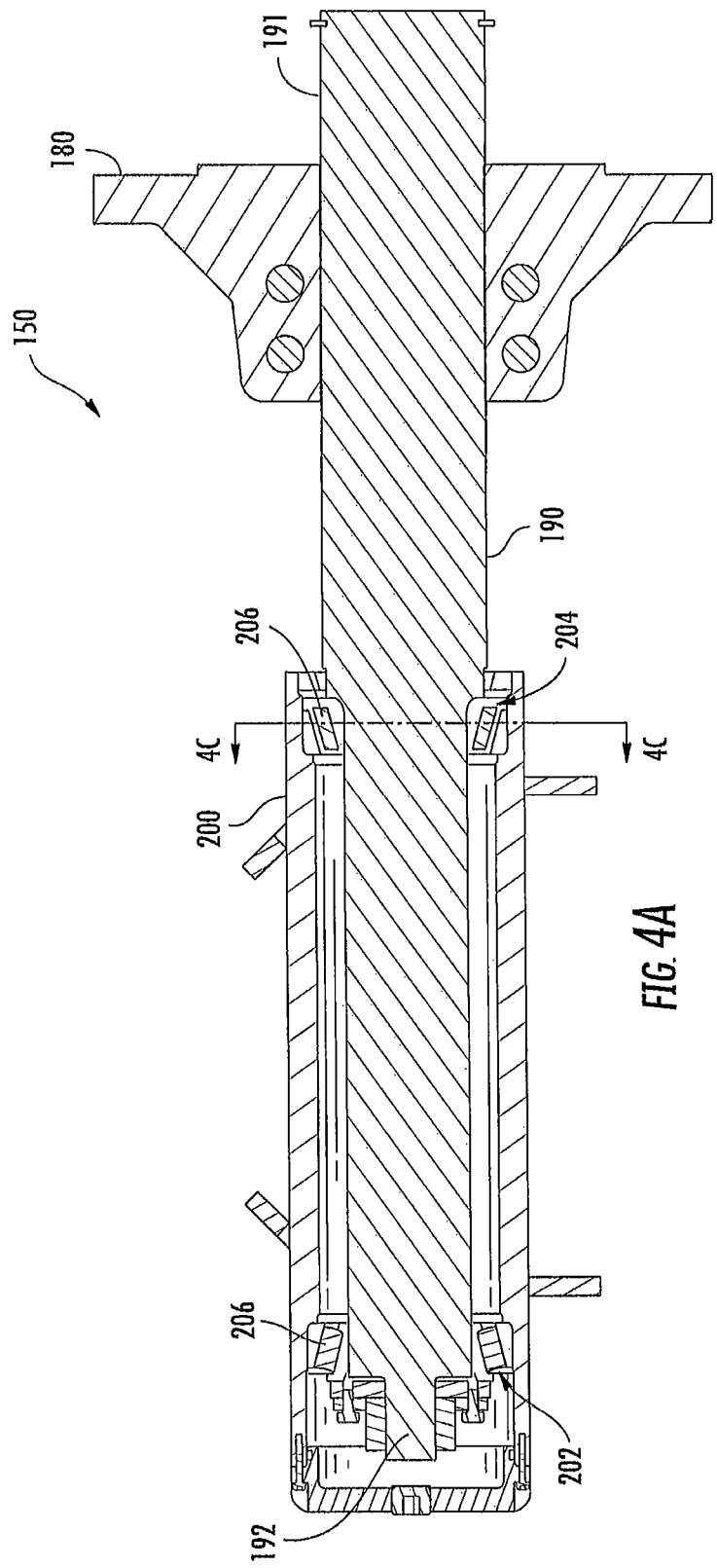
FIG. 4A is a cross-sectional view of the integrated hub and spindle assembly, illustrating the improved integrated hub and spindle assembly, bearing housing and bearing orientation.
Figure 4B:
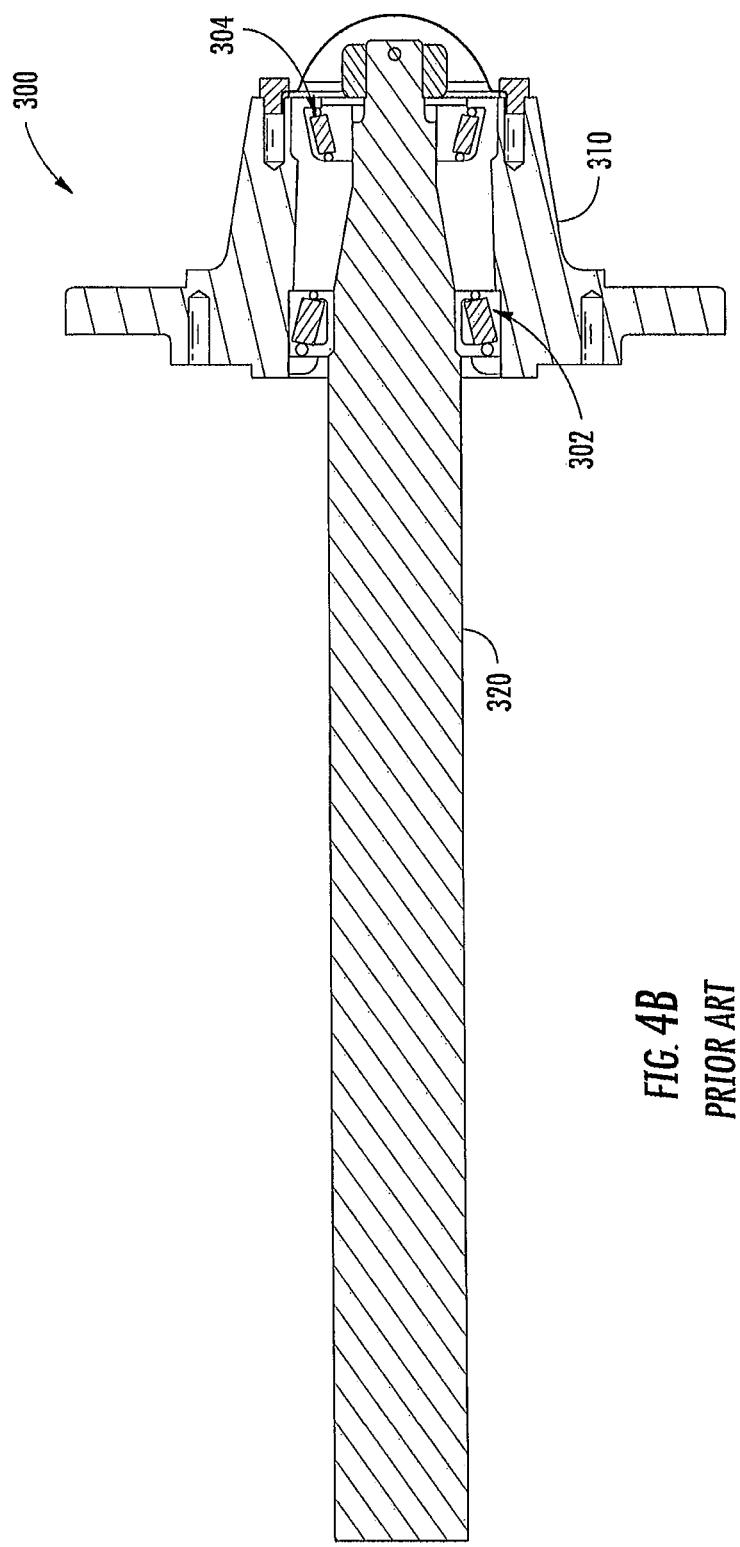
FIG. 4B is a cross-sectional view of the hub and spindle assembly disclosed in the prior art, illustrating a previous hub and spindle and bearing orientation.
Figure 4C:
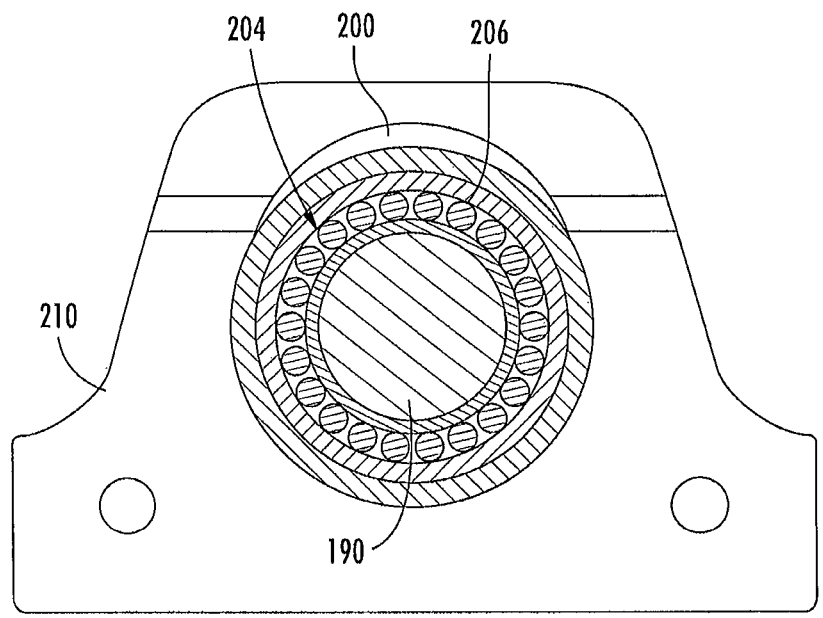
FIG. 4C is a sectional view of the integrated hub and spindle assembly along line 4C-4C in FIG. 4A.

FIG. 4A is a cut away side view of the integrated hub and spindle assembly 150, illustrating the improved integrated hub 180 and spindle 190, bearing housing 200 and the orientation of the bearing assemblies 202, 204. Only some of the bearings 206 are shown and one of ordinary skill in the art would understand that the bearing assemblies 202, 204 may comprise many bearings 206. FIG. 4C is a sectional view of the integrated hub and spindle assembly 150 along line 4C-4C in FIG. 4A. FIG. 4C illustrates the bearing assembly 204 within the bearing housing 200 and surrounding the spindle 190. The improved bearing assembly orientation is clearly illustrated in FIG. 4A, especially when compared to FIG. 4B. FIG. 4B may be used to compare the bearing load and orientation of the integrated hub and spindle assembly 150 with the bearing load and orientation of the prior art. FIG. 4B is a cut away side view of the hub and spindle assembly 300 disclosed in the prior art, illustrating a previous hub 310, spindle 320 and bearing assembly 302, 304 orientation. One difference is that the bearing assemblies 302, 304 in the prior art (FIG. 4B) are located along the spindle 320 within the hub 310. The prior art allows the hub 190 to rotate with respect to the spindle 320 and the bearing assemblies 302, 304 are located off to the side. The bearing assemblies 202, 204 of the improved integrated hub and spindle assembly 150 in FIG. 4A are located in the bearing housing 200, along the spindle 190, directly under the tank 110 (shown in FIGS. 1, 2, and 3). Generally, at least one bearing assembly 204 is located near the center of the spindle 190. Additionally, the prior art discloses bearing assemblies 302, 304 that are positioned close together when compared to the bearing assemblies 202, 204 of the improved bearing orientation.

One advantage to the improved bearing orientation is that the bearing assemblies 202, 204 are located under the tank 110 which allows the bearings 206 to share an approximately equal load from the tank 110 and tank frame assembly 120. With each bearing assembly 202, 204 approximately an equal distance from the center 112 (shown in FIG. 3A) of the tank 110 (shown in FIGS. 1, 2, and 3) the bearings 206 share the load on a level surface. When the tank 110 is carried on a hillside, one of the bearing assemblies 202, 204 will likely hold more of the weight, however, this improved configuration of the bearing assemblies 202, 204 maintains a downward force on each bearing 206 that is substantially more equal than the old bearing configuration shown in FIG. 4B. The old style, seen in the prior art and in FIG. 4B, uses a set of bearing assemblies 302, 304 that is offset to the side of the tank (not shown). The old style works under normal operating conditions with good quality components, however, it has been discovered that under heavy use or neglect the bearings may show wear or fail. With the offset bearing assemblies 302, 304 of FIG. 4B, there is a positive load on the large bearing assembly 302 and a negative load on the small bearing assembly 304. The improved bearing orientation of FIG. 4A provides approximately equal bearing loads which extends the life of the bearing assemblies 202, 204 when compared to the prior art.

In the preferred embodiment, the improved configuration shown in FIG. 4A comprises a pair of tapered roller bearing assemblies 202, 204 spaced apart for better stability. It is anticipated that this configuration may also use ball bearings, or a row of three or more bearings. As long as the bearing assemblies 202, 204 are approximately centered under the weight of the tank 110 (Shown in FIG. 2A) the goal of equal bearing loading is accomplished. It is anticipated that one bearing or bearing assembly could be used; however, it may be difficult to balance in hillside applications. The bearing assemblies 202, 204 illustrated in FIG. 4A have a load capacity that can hold over twice the weight of the full tank 110 and tank frame assembly 120 in the worst loading conditions. A single disclosed bearing assembly 202, 204 may have a dynamic load capacity of approximately 7,490 lbs. In the preferred embodiment, the two bearings assemblies 202, 204 placed approximately twelve (12) inches apart would see about 2,750 lbs. load per bearing assembly 202, 204 with 1000 gallons of water in an attached tank. On the other hand, the bearing assemblies 302, 304 of the prior art, which are placed approximately four (4) inches apart, would see about a 26,125 lbs load on the large bearing assembly 302 and about a 20,625 lbs load on the small bearing assembly 304 with the same 1000 gallons of water. The significant increase in load in the prior art is caused by the bearing assemblies being offset and close together.

Figure 5A:
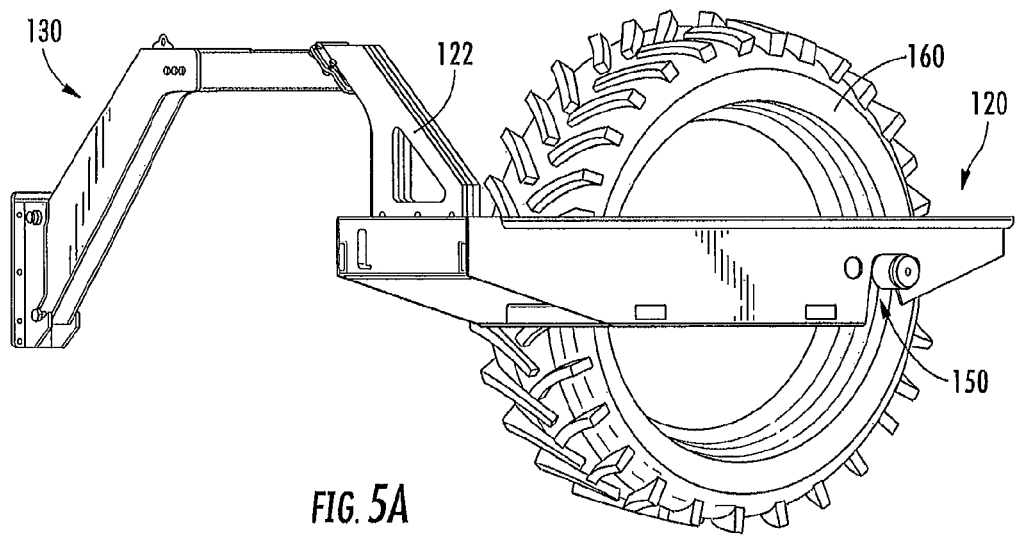
FIG. 5A is a perspective view of the tank frame assembly, illustrating the tank frame assembly in position on the integrated hub and spindle assembly.
Figure 5B:
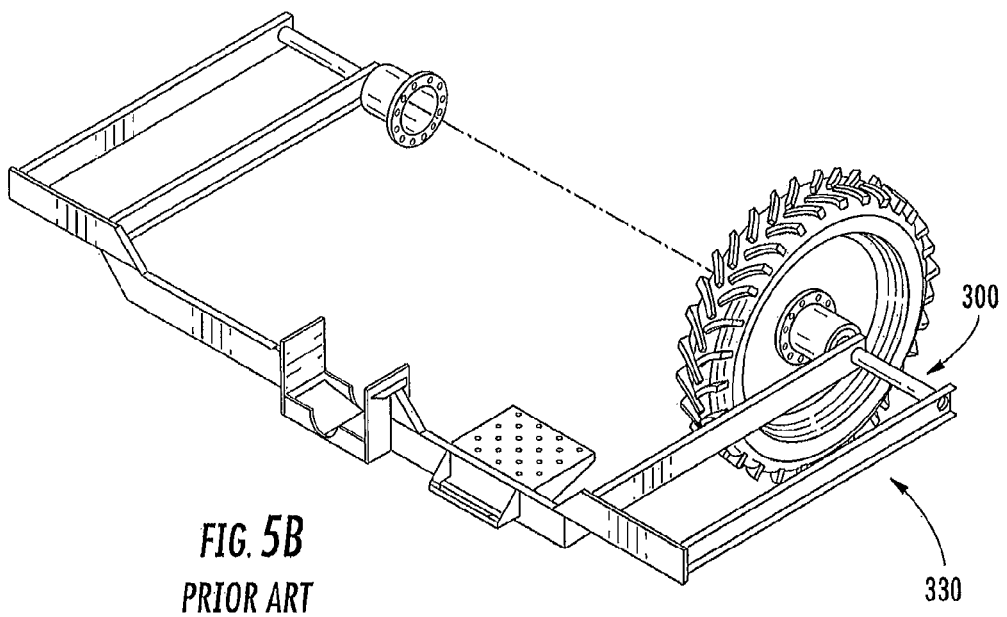
FIG. 5B is a perspective view of the tank frame of the prior art, illustrating the tank frame in position on the hub and spindle assembly.

FIG. 5A is a perspective view of the tank frame assembly 120, illustrating the tank frame assembly 120 in position on the integrated hub and spindle assembly 150 and guide arm assembly 130, and the tractor tire 160. FIG. 5B is a perspective view of a previous tank frame 330 of the '870 patent, illustrating the tank frame 330 in position on the hub and spindle assembly 300 of the '870 patent. As disclosed by FIG. 5B, the previous tank frame 330 must be horizontally attached to the old hub and spindle assembly 300 and must be manually aligned. The prior art discloses the old hub and spindle assembly 300 that must be inserted into the tank frame 330. In other words, the tank frame 330 is slid over the prior art spindle 320 (shown in 4B) and then attached to the prior art spindle 320. Additionally, the previous tank frame 330 must be held in position and supported prior to being fastened to a tractor (not shown). The tank frame assembly 120 disclosed in 5A is held in position by gravity and supported by the integrated hub and spindle assembly 150 and the guide arm assembly 130 prior to being attached. The integrated hub and spindle 150 supports about two thirds (⅔) of the weight and the guide arm assembly 130 supports about one third (⅓) of the weight.

Figure 6:
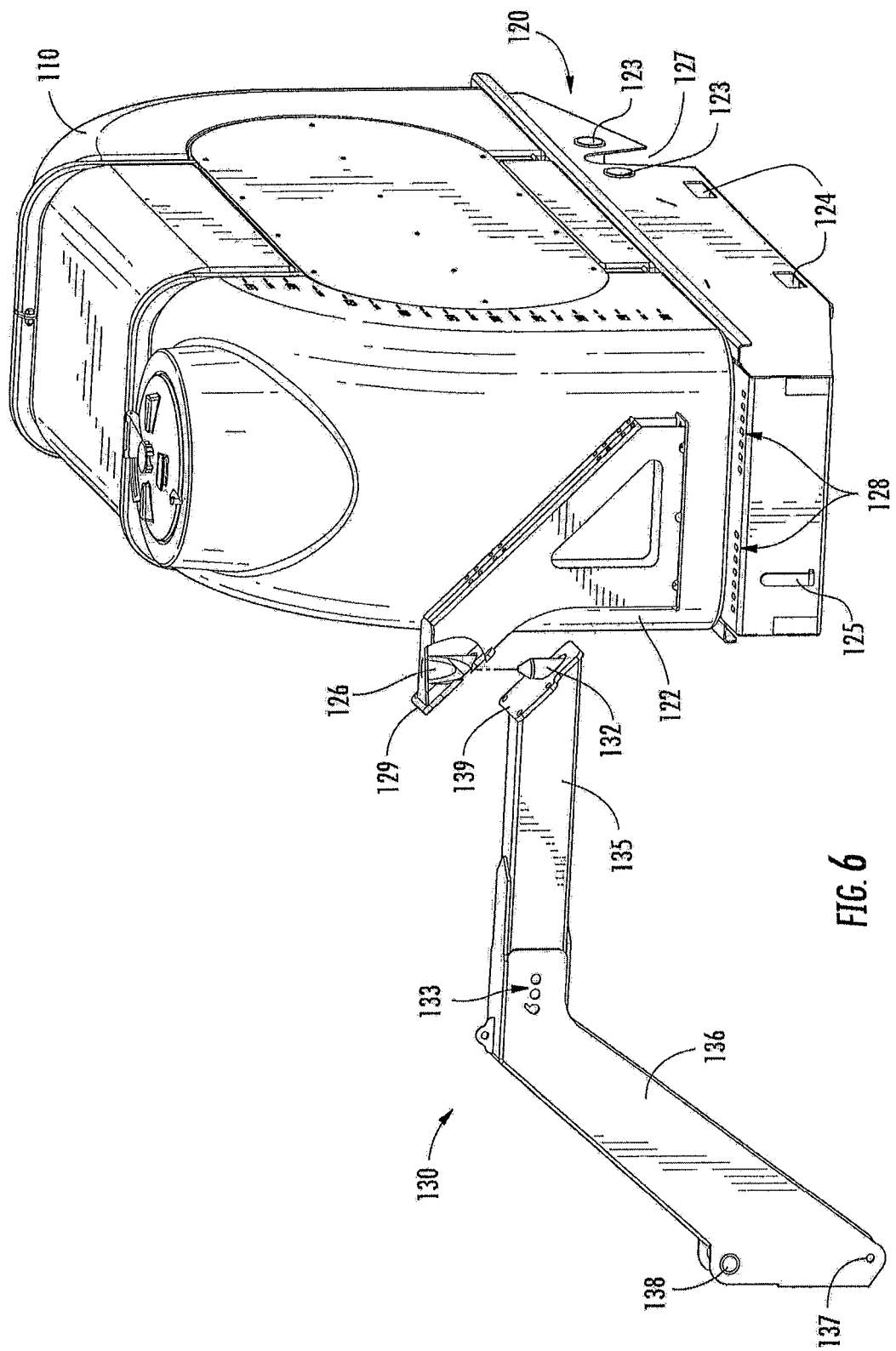
FIG. 6 is a detached perspective view of the guide arm assembly, tank frame stabilizing arm, tank and tank frame assembly.

FIG. 6 is a detached perspective view of the guide arm assembly 130, tank frame stabilizing arm 122, tank 110 and tank frame assembly 120. Additionally, FIG. 6 illustrates a cut-away of the tank frame stabilizing arm 122 showing a receiver bushing 126 for receiving the male guide member 132 of the guide arm assembly 130. The receiver bushing 126 serves as a guide for properly aligning the stabilizing arm plate 129 and the guide arm assembly plate 139 for mating. Additionally, FIG. 6 discloses slots 128 in the tank frame assembly 120 for adjustably attaching the tank frame stabilizing arm 122. In the preferred embodiment, the tank frame stabilizing arm 122 is attached to the tank frame body portion 121 by four attachment members, such as bolts (not shown). A plurality of slots 128 located on the tank frame body portion 121 allow the tank frame stabilizing arm 122 to be horizontally adjusted or reversed when attaching the tank frame assembly 120 to the other side of the tractor (shown in FIG. 1).

FIG. 6 also discloses the preferred embodiment, wherein the angled body portion 136 of the guide arm assembly 130 extends up and away from the tractor attachment plate 134 and is ultimately parallel to the integrated hub and spindle assembly 150. The angled body portion 136 comprises apertures 137, 138 for connecting to the tractor attachment plate 134 (shown in 2B). Additionally, a straight body portion 135 extends from the angled body portion 136. Welding apertures 133 in the angled portion 136 allow the angled body portion 136 to be attached or welded to the straight body portion 135. The straight body portion 135 is approximately parallel to the integrated hub and spindle 150 and comprises the male guide member 132. The male guide member 132 is mateable to the receiver bushing 126 in the tank frame stabilizing arm 122 of the tank frame assembly 120. After the tank frame assembly 120 has been vertically lower onto the male guide member 132 of the guide arm assembly 130 and the bearing housing 200, the tank frame assembly 120 may be fastened to the guide arm assembly 130. The tank frame assembly 120 may be attached to the guide arm assembly 130 by bolts, screws, welding, or any other fastener or device known to those skilled in the art. Additionally, the tank frame assembly 120 may include a handle 125 for shutting off the flow of liquid from the tank 110. Furthermore, FIG. 6 discloses the mounting tubes 123 and rectangular forklift apertures 124 for receiving forklift arms for lifting and mounting the tank frame assembly 120 and the tank 110. The forklift apertures 124 allow for easy vertical mounting of the tank 110 and tank frame assembly 120.

Figure 7A:
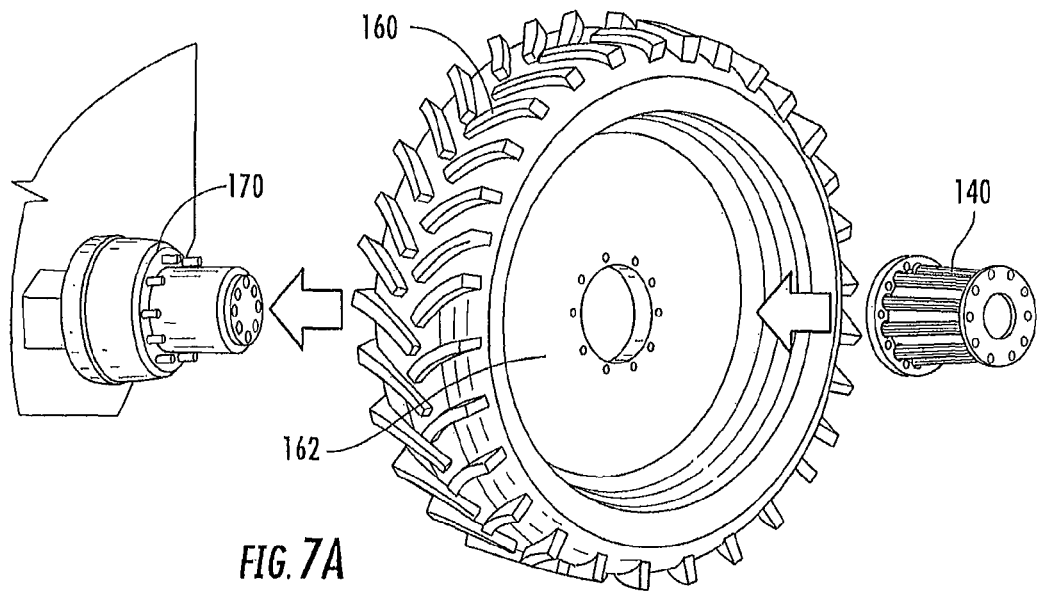
FIGS. 7A-7F illustrate the different steps involved in the process of attaching the integrated hub and spindle assembly and the associated self-aligning tractor axle mounted tank system.
Figure 7B:
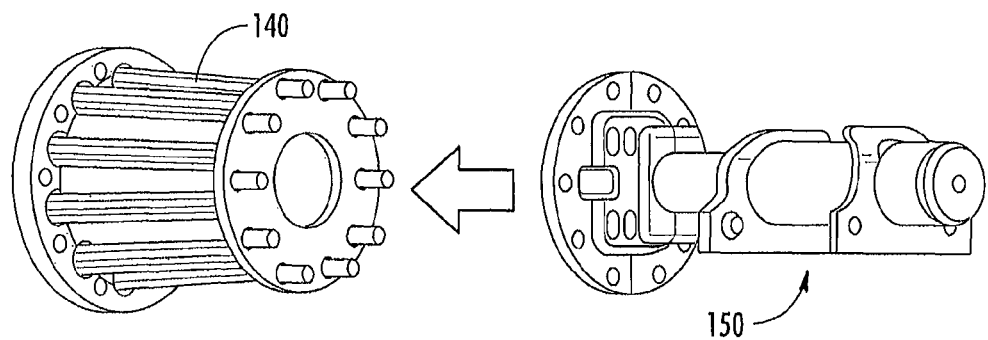
Figure 7C:
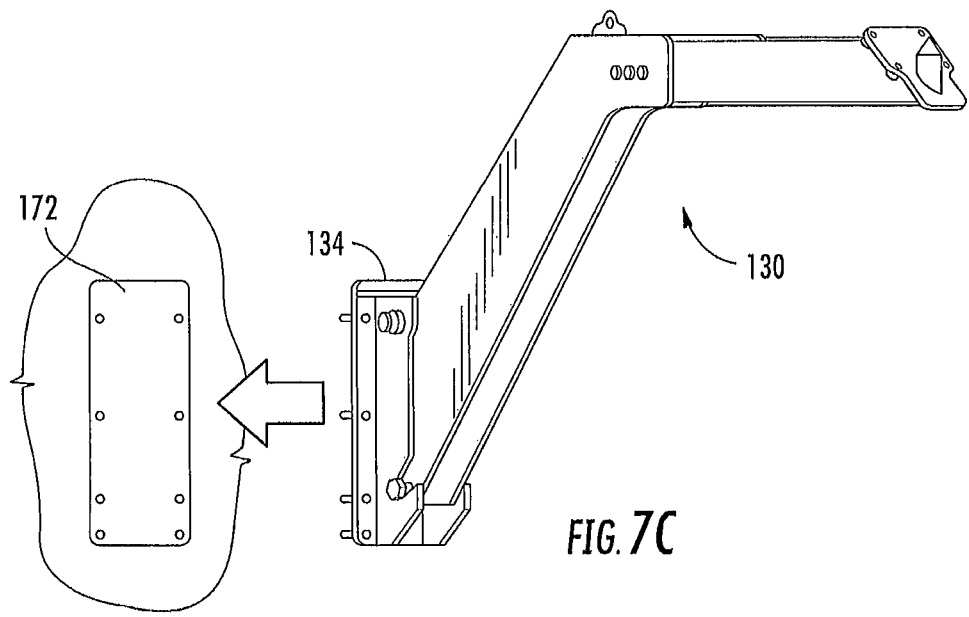
Figure 7D:
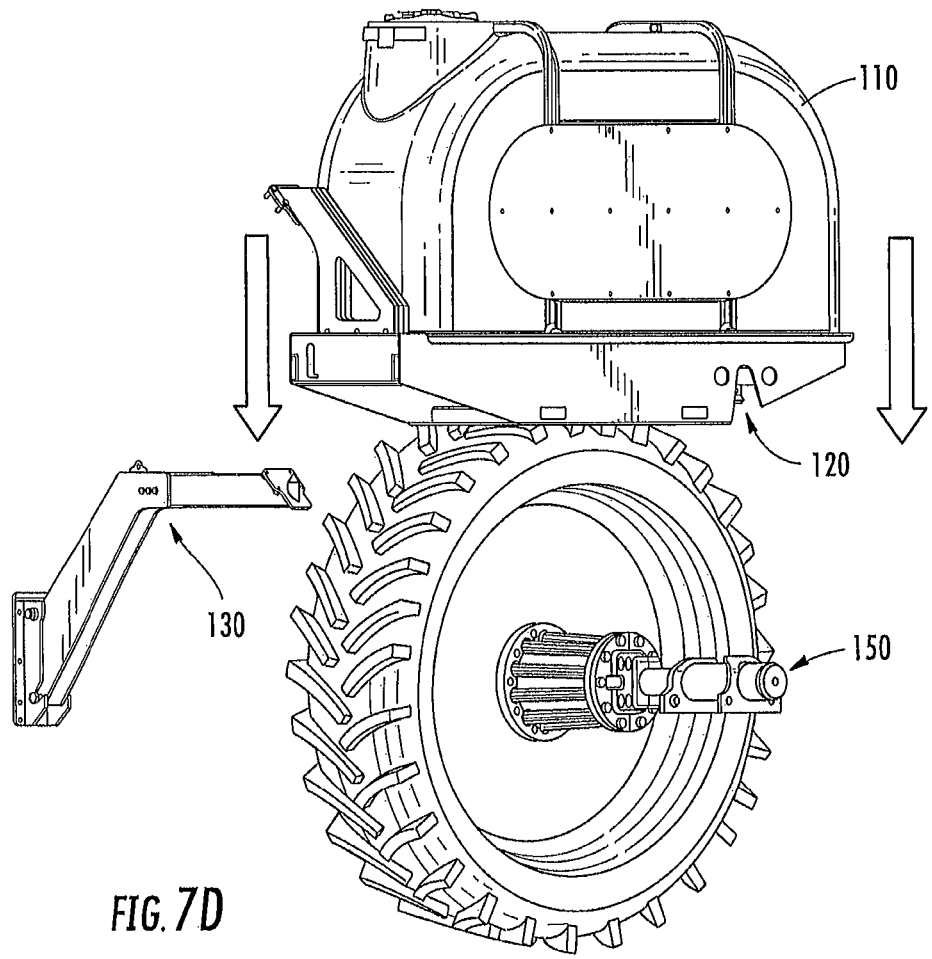
Figure 7E:
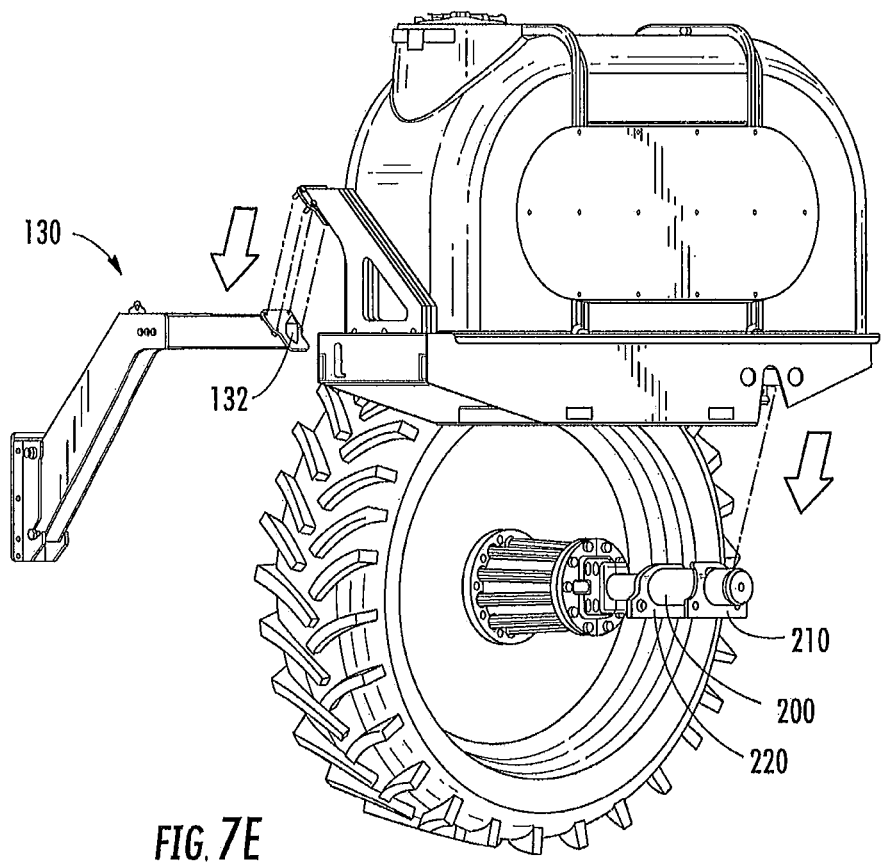
Figure 7F:
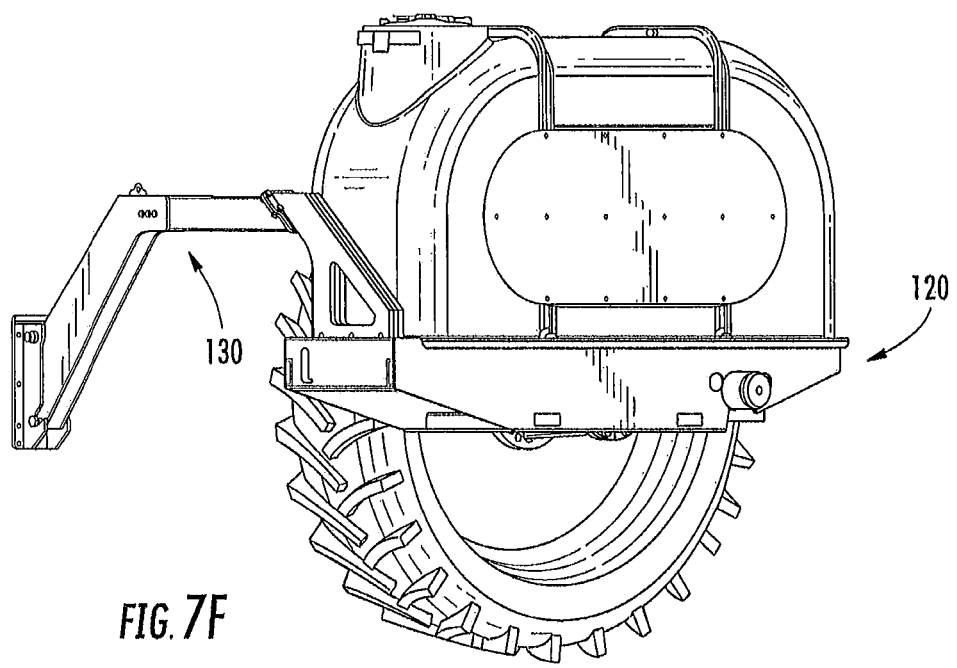

FIGS. 7A-7F illustrate the different steps involved in the process of attaching the integrated hub and spindle assembly 150 and the associated self-aligning tractor axle mounted tank system. FIG. 7A illustrates the step of the process in which the drum 140 is attached to the rim 162 of the tire 160 and the rear axle 170 of the tractor 155 (shown in FIG. 1). FIG. 7B illustrates the step of the process in which the integrated hub and spindle assembly 150 is attached to the drum 140. FIG. 7C illustrates the step of the process in which the tractor attachment plate of 134 of the guide arm assembly 130 is attached to a mated guide arm attachment plate 172 of the tractor 155 (shown in FIG. 1). FIG. 7D illustrates the step of the process in which the tank 110 and tank frame assembly 120 are lowered onto the integrated hub and spindle assembly 150 and guide arm assembly 130. FIG. 7E illustrates the step of the process in which the tank frame assembly 120 is aligned to the integrated hub and spindle assembly 150 by the bearing housing brackets 210, 220 on the bearing housing, the tank frame brackets 215, 225 (shown in FIGS. 3A and 3B) and the male guide member 132 on the guide arm assembly 130; and FIG. 7F illustrates the step of the process in which the tank frame assembly 120 has been fixedly attached to the integrated hub and spindle assembly 150 and the guide arm assembly 130. These steps are merely representative and it should be understood that various steps and operations are described in one possible order of operation, but those skilled in the art will recognize that steps and operations may be rearranged, replaced, or eliminated as long as the same ultimate goal is accomplished.

The foregoing embodiments provide advantages over currently available devices. In particular the integrated hub and spindle assembly 150 and self-aligning tractor axle mounted tank system described herein allows for guided alignment of the tractor axle mounted tank 110, and tank frame assembly 120, during mounting. Additionally, the bearing orientation disclosed evenly distributes the load on the bearings 206, increasing the life of the bearings 206. Furthermore, the process of vertically attaching the tank 110 allows gravity to hold the tank 110, and the tank frame assembly 120, in position while fasteners are installed, securing the tank frame assembly 120.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references, including but not limited to, upper, lower, upward, downward, left, right, leftward, rightward, top, bottom, above, below, vertical, and horizontal are only used for identification purposes to aid the reader's understanding of the embodiments of the present invention, and do not create limitations, particularly as to the position, orientation, or use of the invention unless specifically set forth in the claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, and member. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Although the present invention has been described with reference to certain embodiments, persons ordinarily skilled in the art will recognize that changes in detail, form, or structure may be made without departing from the spirit of the invention as defined in the appended claims.

The accompanying Figures depict embodiments of the apparatus and/or process and features and components thereof. With regard to means for fastening, mounting, attaching or connecting components to form the apparatus and/or process as a whole, unless specifically described otherwise, such means are intended to encompass conventional fasteners such as machine screws, machine threads, seals, snap rings, clamps, rivets, nuts and bolts, toggles, pins and the like, and bearings. Components may also be connected adhesively, by friction fitting, or by welding or deformation, if appropriate. Unless specifically otherwise disclosed or taught, materials for making components of the present invention are selected from appropriate materials such as metal, metallic alloys, stainless steel, natural or synthetic materials, plastics and the like, either rigid or soft, and appropriate manufacturing or production methods including casting, extruding, molding and machining may be used. In addition, any type of bearings known to those skilled in the art may be used within the scope of the invention. The dimensions of the components of the invention may also vary widely without departing from the scope of the invention.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A self-aligning tractor axle mounted tank system for vertically mounting a tank to a tractor, comprising:
   an integrated hub and spindle;
   a housing connected to the spindle so that the spindle can rotate with respect to the housing;
   a plurality of spaced apart bearing assemblies within said housing and between said housing and said spindle providing rotation of said spindle with respect to said housing;
   said integrated hub rotating together with said spindle with respect to said housing;
   at least one housing bracket connected to the housing, wherein the housing bracket mates with at least one tank frame bracket, during vertical mounting to self-align said tractor axle mounted tank to said tractor; and
   said tank frame bracket is selectively removable from said housing bracket.

2. The system of claim 1 wherein:
   said at least one housing bracket includes a vertical portion;
   said at least one tank frame bracket includes a vertical portion; and said housing bracket vertical portion and said tank frame bracket vertical portion align with each other to self-align said tractor axle mounted tank to said tractor.

3. The system of claim 1, further comprising the tank frame assembly having a tank frame stabilizing arm, wherein the tank frame stabilizing arm mates with a guide arm attached to the body of said tractor.

4. The system of claim 3, wherein the tank frame stabilizing arm comprises a receiver bushing for guiding a male guide member attached to the guide arm assembly.

5. The system of claim 3, wherein the tank frame assembly is supported by the housing and the guide arm assembly prior to attachment.

6. The system of claim 2, wherein the housing bracket is configured to receive at least one attachment member for attaching the tank frame bracket to the housing bracket.

7. The system of claim 1, wherein the bearing assemblies are positioned to approximately evenly distribute the load from the tank frame assembly.

8. The system of claim 1, wherein the tank frame assembly is placed directly above the bearing assemblies.

9. The system of claim 1, further comprising a tank connected to the tank frame assembly.

10. The system of claim 1, further comprising a drum attached to the integrated hub and spindle and attachable to a rear axle of the tractor, the rear axle having a longitudinal axis of rotation.

11. The system of claim 1, further comprising two tank frame brackets attachable to two housing brackets;
   a tank frame stabilizing comprising a receiver bushing connected to the tank frame; and
   a guide am assembly comprising a male guide member received by the receiver bushing.

12. An integrated hub and spindle assembly, comprising:
   a spindle connected to a hub;
   a bearing housing connected to the spindle so that the spindle can rotate with respect to the bearing housing;
   a plurality of spaced apart bearing assemblies inside the bearing housing and positioned to approximately evenly distribute a load placed on the bearing housing;
   said hub rotating together with said spindle with respect to said bearing housing;
   at least one housing bracket attached to said bearing housing, said housing bracket mating with a frame assembly bracket;
   said housing bracket and said frame assembly bracket self-aligning said frame assembly to said integrated hub and spindle assembly; and
   wherein said frame assembly is selectively removable from said housing bracket.

13. The assembly of claim 12, further comprising a drum attached to the hub.

14. The assembly of claim 13, further comprising a rear axle of a tractor attached to the drum.

15. The assembly of claim 12, further comprising a rear tractor axle directly attached to the hub.

16. The assembly of claim 12, further comprising:
   said at least one housing bracket includes a vertical portion and an angled portion;
   said at least one frame assembly bracket includes a vertical portion and an angled portion; and
   said housing bracket vertical portion and said frame assembly vertical portion align with each other to self-align said frame assembly to said integrated hub and spindle assembly.

17. A process for mounting a self-aligning tank to a rear axle of a tractor, comprising the steps of:
   connecting an integrated hub and spindle assembly to the rear axle, the spindle having a bearing housing connected thereto such that the integrated hub and spindle can rotate together with respect to the bearing housing via a plurality of spaced apart bearing assemblies within said bearing housing and between said bearing housing and said spindle, the bearing housing having at least one housing bracket connected to the top of the bearing housing;
   attaching a guide arm assembly to the body of the tractor, the guide arm assembly having a male guide member receivable by a tank frame assembly;
   the tank frame having at least one tank frame bracket;
   said at least one housing bracket includes a vertical portion;
   said at least one tank frame bracket includes a vertical portion;
   lowering the tank frame assembly and tank onto the bearing housing and guide arm assembly, wherein said at least one housing bracket vertical portion aligns with said at least one tank frame bracket vertical portion such that the tank frame assembly is aligned by the brackets and male guide member and supported by the guide arm assembly and hub and spindle assembly;
   securing the tank frame assembly to the guide arm assembly; and
   securing the housing bracket to the tank frame bracket.

18. The process of claim 17, wherein the step of connecting the integrated hub and spindle assembly comprises attaching a drum to the rear axle and attaching the integrated hub and spindle assembly to the drum.

19. The process of claim 18, wherein the step of attaching a drum comprises attaching a drum to the rear wheel rim of the tractor, the rear wheel rim being attached to the rear axle.

* * * * *